United States Patent [19]
Callahan et al.

[11] 3,865,628
[45] Feb. 11, 1975

[54] REMOVAL OF POLYMER RESIDUE FROM SURFACES OF PROCESSING EQUIPMENT

[75] Inventors: Joseph W. Callahan, Sulfur, La.; Charles A. Landry, Richmond, Va.

[73] Assignee: Cesco, Inc., Houston, Tex.

[22] Filed: Feb. 26, 1973

[21] Appl. No.: 335,678

[52] U.S. Cl. .................. 134/2, 134/22 R, 134/29
[51] Int. Cl. .............................................. C23g 1/14
[58] Field of Search ............... 134/2, 22 R, 29, 20; 252/80, 86, 156

[56] References Cited
UNITED STATES PATENTS

| | | | |
|---|---|---|---|
| 2,584,017 | 1/1952 | Dvorkovitz et al. | 252/156 |
| 3,447,963 | 6/1969 | Callahan | 252/80 X |
| 3,485,670 | 12/1969 | Fisher | 134/29 X |
| 3,740,267 | 6/1973 | Haylock | 134/22 R X |
| 3,764,384 | 10/1973 | Berni | 134/22 R X |

OTHER PUBLICATIONS
The Sequestration of Metals, Smith, Macmillan Co., New York (1959), p. 112.

Soap and Chemical Specialties, "Gluconates in Alkaline Cleaners," Downey and McCallion, October 1959, pp. 45–58.

Rohm and Haas Co. Technical Bulletin (I), Triton BG–10, p. 1. Feb. 1973.

Rohm and Haas Co. Tech. Bulletin (II), Triton BG–10, p. 1, April 1971.

Primary Examiner—S. Leon Bashore
Assistant Examiner—Marc L. Caroff

[57] ABSTRACT

Polymer residue is removed from the surfaces of processing equipment used in the manufacture of terephthalate polyesters by contacting the surfaces with an aqueous solution containing at least 35% by weight potassium hydroxide and, optionally, a chelating agent and a surfactant; the solution contacting the residue at at least 180° F. The equipment is subsequently flushed with water at at least 160° F.

9 Claims, No Drawings

REMOVAL OF POLYMER RESIDUE FROM SURFACES OF PROCESSING EQUIPMENT

BACKGROUND OF THE INVENTION

This invention relates to a new and useful method for removing polymeric residue from the processing equipment used to manufacture terephthalate polyesters. Terephthalate polyesters have been used extensively in recent years, particularly as fibers and for molding many useful articles. Basically the process involves reacting terephthalic acid or terephthalic anhydride with a dihydric compound such as a glycol, ethylene glycol, or propylene glycol, for example, or cyclohexanedimethanol. A number of processes are practiced in the production of the terephthalate polyesters; and the reactants used in practiced processes are well known. For a description of a number of the fibers produced see, for example, "Man-made Fibers," R. W. Moncrieff, 5th Edition, John W. Wiley and Sons, Inc., New York, 1970 at Chapter 23. Another particularly important publication discussing most of the recent patent literature concerning the manufacture of polyester resins is "Polyester Fiber Manufacture," Marshal Sittig, Noyes Data Corporation, Parkridge, New Jersey, 1971, which describes processes used and equipment employed in the manufacture of the terephthalate polyesters.

In the manufacture of these materials, some of the product produced, undesirable branched-chain polymers, or polymers having a higher molecular weight than is desired, become attached to the surfaces of the various pieces of process equipment and transfer lines. This equipment includes reactors, transfer lines, spinnerette packs and heat exchangers, for example, particularly such as those shown in the above-mentioned Sittig publication. The deposited polymers build-up on the surface of the process equipment such that flow is restricted and after a period of time, the polymers will begin to carbonize on the surface of the equipment and additional polymer residue deposits on said carbonized polymer residue restricting flow. After a period of time flow could be stopped altogether.

It is therefore periodically necessary during the production of terephthalate polyesters to clean the process equipment to remove these adhering polymers and carbon to provide a clean surface for maximum process flow and such that once the process equipment is put back on stream the process can be operated for a long period of time without the necessity of shutting-down for another period of cleaning.

The unwanted polymer residue, as initially formed is generally a white material which is very dense and forms a strong bond to the metal. However, as production is continued, this polymer residue begins to cook and finally carbonizes to a black polymer residue resembling coke. The white polymer is slowly soluble in an ethylene glycol solvent which is often one of the raw materials used in the process. However, use of the glycol as a solvent results in a very slow cleaning operation requiring extended periods of down-time and loss of valuable production time. The glycol cleaning process involves circulating the hot solvent which is inherently a fire hazard since the glycol is effective as a solvent only above the flash point of the glycol. Additionally, the carbonized polymer residue is completely insoluble in the glycol.

Other methods of cleaning in the past have included the use of high pressure water, manual cleaning and even controlled burning. High pressure water cleaning and manual cleaning is not effective because all areas within the system cannot be contacted. Also, this type of cleaning often leaves a seed scale on the metal to which new fouling readily attaches. Controlled burning requires that equipment be dismantled and sent to a special installation where this cleaning can be done. There is a great deal of time consumed in this dismantling and movement of the equipment, and also the possibility of damage to the equipment exists.

Accordingly, it is the object of our invention to provide a process for removing polymer residue from the equipment used in the manufacture of terephthalate polyesters. It is a further object of our invention to provide such a cleaning process which allows for the thorough removal of such polymer residue without dismantling process equipment allowing for a minimum of downtime.

The foregoing objects are accomplished through the practice of our invention as hereinafter described.

SUMMARY OF THE INVENTION

Polymer residue building-up in process equipment such as reactors, heat exchangers, spinnerette packs and transfer lines used in the process for the manufacture of terephthalate polyester resins is removed by contacting the polymer residue including carbonized polymer residue with an aqueous treating solution containing at least about 35% by weight potassium hydroxide, up to about 7.0% by weight of a chelating agent and up to about 1.5% by weight of a stable surfactant. The polymer is contacted with the solution at a minimum temperature of about 180° F to obtain satisfactory cleaning. The polymer residue may be removed at a faster rate by using higher temperatures with the maximum temperature being determined by practical rather than theoretical considerations. Temperatures above 210° F, as a practical matter, do not decrease the time required to remove the polymer residue from the equipment.

The liquid solvent can either remain in contact with the surface upon which the polymer residue has attached, with periodic replacement during the cleaning process, or can be continuously circulated through the equipment to be cleaned. The latter has been found to be preferable in obtaining the shortest time necessary for the cleaning process. The temperature at which the cleaning process is practiced may be maintained either by heating the solution itself or by heating the surface which is to be cleaned. After contacting with cleaning solution, the equipment must be flushed with water at about 160° F to about 210° F.

DESCRIPTION OF THE PREFERRED EMBODIMENTS

The polymer residue, heretofore described, resulting from the process for the preparation of terephthalate polyester resins is easily removed from process equipment through the use of an aqueous solution containing about 35% to about 55% by weight potassium hydroxide, or caustic potash as it is sometimes called. The aqueous solution also may contain up to about 7.0% by weight of a chelating agent. Another optional component of the solvent in the practice of our invention is surfactant soluble in a liquid potash solution which is about 55% potassium hydroxide. This amphoteric surfactant may be present in amounts up to about 1.5% by weight if the practitioner desires to include this optional ingredient. It is a preferred embodiment of our invention to include both the chelating agent and the surfactant.

As stated hereinbefore, the practice of our invention is advantageous since it can be carried out without dismantling the process equipment being cleaned, and since it provides thoroughly cleaned equipment ready for reuse in the process of making the terephthalate polyesters with a minimum of down-time. In fact, it is within the scope of our invention to circulate the hot liquid cleaning solution through the entire system, thus cleaning all the equipment at one time.

Of course, the length of time required to accomplish the cleaning depends upon the degree of fouling by the polymer residue and the extent to which this polymer residue includes carbonized materials. It is clear that equipment having severe quantities of polymer residues would necessarily require a longer cleaning time than those with lesser amounts. Nevertheless, we have discovered that the process of our invention operates very well to provide clean surfaces within the reaction equipment by removing the polymer residues, including the difficultly removable carbonized form of the polymer residue.

The solution used in the practice of our invention is an aqueous solution of potassium hydroxide. Heretofore, when alkaline cleaning solutions were used, either sodium hydroxide or potassium hydroxide could be used interchangeably. We have surprisingly discovered that only potassium hydroxide performs satisfactorily in the practice of our invention. It is present in the alkaline solution in the amounts of about 35% by weight to about 55% by weight with the preferable range being between about 40% and about 45% by weight. While solutions stronger than 55% may be used without departing from the scope of our invention, no practical advantage is obtained by such use.

Another component of the aqueous solvent used in the practice of our invention may be a chelating agent which is present in up to about 7.0% by weight and preferably from about 2.5% to about 7.0%; most preferably from about 4.5% to about 5.5% by weight. Any of the usual chelants such as the polyamino carboxylic acid products, including the sodium, potassium, ammonium or calcium salts of these acids, for example, are useful in the practice of our invention. Typical of these materials are, for example, ethylenediamine tetraacetic acid, nitrilo triacetic acid, gluconic acid, diethylenetriamine pentaacetic acid. For the practice of our invention, the salts of gluconic acid are preferred, particularly sodium gluconate.

Cleaning the polymer residue of the different processes, see Sittig, supra, places different requirements on the cleaning composition. In some cases only the potassium hydroxide is necessary and in other cases the chelant and/or surfactant is necessary. The determination of the necessity of inclusion of either or both of these ingredients is made by a simple experiment, hereinafter discussed.

Surfactants that are stable in hot aqueous potash solutions up to 55% by weight in concentration can be an added ingredient of the cleaning solution when desirable. The presence of the surfactant is helpful to aid in the wetting and penetrating ability of the aqueous solution. Two such surfactants are Rhome and Haas' TRITON BG-10 and Olin's Poly Tergent 10 G. Certain organic phosphate esters such as glycerolphosphoric acid esters, for example, are also satisfactory. When a surfactant is used, it is present in amounts up to about 1.5% by weight and preferably is an amount of from about 0.5% to about 1.5% by weight.

The method of our invention involves isolating the piece of process equipment in which the polymer residue has accumulated from the rest of the equipment in the plant and attach to it a conduit, often at process connections, through which the hot cleaning solution can flow in the manner well known to those skilled in the art. It is understood that the cleaning solution can be circulated through all the process equipment except probably the spinnerette packs, at one time. The hot aqueous material can either be charged to the vessel and contact the polymer residue with periodic changing of solution or it can be continuously circulated through the equipment.

It is to be understood that the solution can be heated by an external source before it is pumped into the vessel or it can be heated in the vessel itself while the aqueous solvent is in contact with the polymer residue being removed. For example, when a shell and tube exchanger is cleaned, or an entire process is cleaned, or the like, steam could be charged to the shell side of the heat exchanger while the liquid aqueous cleaning solution is on the tube side in contact with the residue.

While the flow rate of the cleaning solution through the equipment is not critical to the practice of our invention when the circulation embodiment is used, we have found that a flow of about 1,000 gallons per minute is acceptable, even though lesser or greater flow rates may be used. When pumps in the polyester process are used a greater flow generally results.

The cleaning process of our invention is carried out at least about 180° F. Below this temperature even prolonged contact with the polymer residue to be removed does not properly clean the equipment. Satisfactory cleaning temperatures to be used range up to about 210° F and the preferred temperature range is between about 195° F and about 210° F. While higher temperatures can be used, we have found that such higher temperatures do not substantially decrease cleaning time and thus would be wasteful as far as the energy considerations necessary to attain the higher temperatures.

After cleaning, the cleaning solution is drained from the equipment being cleaned and the equipment is then flushed with water to remove portions of polymer residue detached from the surface of the equipment but not dissolved by the cleaning solution. We have found this flushing step is carried-out by pumping water at a temperature of at least about 160° F and preferably from about 160° F to about 210° F through the equipment. We have found that this hot water flush disperses the material not soluble in cleaning solution and leaves the equipment thoroughly cleaned.

Another particular advantage to the practice of our invention is that the aqueous cleaning solution can be recovered from the cleaning process and reused at a later date. Since chemical plants manufacturing terephthalate polyesters require periodic shut-down for cleaning this would allow a plant operator to erect permanent storage in the vicinity of his polyester unit and install permanent piping to the areas of the unit where most frequent cleaning of polymer residue fouling is necessary. A permanent arrangement of this nature would result in even further decreases in down-time of the unit necessary for cleaning and could allow the operator of the terephthalate polyester plant to clean certain parts of the unit while the unit was shut-down for repairs or mechanical maintenance in other areas. In short, the practice of the process of our invention allows many economic savings to the operator of terephthalate polyester plants.

Of course, after the aqueous cleaning solution used in the practice of our invention has been used it will be contaminated somewhat with the polyester residue removed. These contaminants can be easily removed by filtration, centrifuge or other mechanical separation techniques well known to those skilled in the art. Reuse would also require the addition of more potassium hydroxide and chelating agent to restore the optimum levels of the cleaning solution as hereinbefore disclosed. The degree of addition necessary is easily determined by simple chemical analysis and surface tension measurements of the cleaning solution.

As hereinbefore mentioned, the polymer residue resulting from different processes for the production of terephthalate polyesters have different requirements with respect to the composition of the aqueous cleaning solution. This composition is determined by simple laboratory experiments run on samples of the polymer residue to be removed. A series of tests are run in laboratory glassware wherein separate portions of the sample are contacted with treating solutions of different composition to best determine what composition is necessary for a particular cleaning problem. Examples 1 through 3 describe the laboratory procedure and show results of various screening experiments. Once the particular solution composition is known for treating a particular polymer residue, the composition to be used is readily predictable and such screening tests are no longer necessary.

As an alternative, yet more theoretical, method for determining the necessity of including the chelating agent in the cleaning solution with the potassium hydroxide, samples of the polymer residue to be removed may be dissolved in aqua regia and analyzed by atomic absorption spectroscopy to determine the content of metals in the polymer residue to be treated. As a rule of thumb we have established that a total metal content in excess of about 3% by weight would require the presence of the chelating agent in the preferred amounts hereinbefore discussed. The metals sometimes present in the polymer residue have been found to be iron, copper, nickel and manganese, for example.

The above-described invention will be further illustrated by the following examples which are offered for purposes of instruction only and should not be considered as constituting any limitation of the scope of our invention as hereinbefore described and hereinafter claimed.

EXAMPLE 1

A 12 gram sample of polyester residue, including carbonized polymer residue, obtained from esterification reactors, poly-condensate reactors, vapor recovery systems and spinnerette packs were immersed in 600 ml. of the following liquid solution in laboratory glassware equipped with a magnetic stirrer:

40% by weight Potassium Hydroxide
5.5% by weight Sodium Gluconate
.5% by weight stable surfactant (TRITON BG-10)
54% by weight water TRITON BG-10 is an alkyl glucoside in a dark brown, viscous 70% aqueous solution having the following physical and chemical characteristics: viscosity—1,900 cps at 25° C. (Brookfield No. 3 spindle, 12 r.p.m.); specific gravity—1.15 at 25° C.; density—9.6 lbs. per gallon; pH—6.0–8.0 (5% active aqueous solution); cloud point—clear 0°–100° C. (1% active in distilled water); freezing point—-8° C. (18° F.); odor—mild, characteristic.

The samples contained in a stainless steel basket to prevent contact with the stirrer were contacted for 4 hours at 200° F ± 5° F. During the solvent contact with the fouling, the solution was agitated with the magnetic stirrer. After this period of time, the polymeric fouling was dissolved leaving precipitated carbonaceous polymer residue. The solution was decanted and the precipitate completely dispersed by adding 600 ml. water at 175° F.

EXAMPLE 2

Example 1 was duplicated using the following solution:

30% by weight Potassium Hydroxide
5.5% by weight Sodium Gluconate
0.5% by weight stable surfactant (TRITON BG-10)
64% by weight water The results were checked after 4, 6, 8 and 10 hours contact time. After the full 10 hour treatment, less than 50% of the polymer had dissolved, and less than 10% of the carbonized residue was dissolved. This demonstrates that at least about 35% by weight potassium hydroxide is necessary for thorough cleaning.

EXAMPLE 3

Example 1 was duplicated using the following solution:

45% by weight Sodium Hydroxide
5.5% by weight Sodium Gluconate
0.5% by weight stable surfactant (TRITON BG-10)
54% by weight water The results were checked after 4, 6, 8, 10 and 12 hours contact time. After the full 12 hours, less than 30% of the polymer residue had been dissolved. This demonstrates that sodium hydroxide is not applicable to the practice of our invention.

EXAMPLE 4

A single esterification reactor for the production of dimethylterephthalate from methanol and terephthalic acid was fouled with polymer residue including carbonized polymer residue. This reactor was isolated from other equipment in the process by disconnecting process lines and circulated with the solution of Example 1 for 6 hours at 200° F. The cleaning solution was circulated through hoses connected to the reactor at the process connections from a truck containing about 1,500 gallons of solution equipped with internal coils for steam-heating and a circulating pump. The pump had an outlet pressure of 60 to 80 psig and the solution was circulated at about 1,000 gallons per minute. After flushing the reactor with water at 175° F for about 1 hour, the reactor was opened and inspected and was found to be 100% free of polymer residue including the carbonized polymer residue.

EXAMPLE 5

A poly-condensation reactor for the production of polyethylene terephthalate from dimethylterephthalate intermediate was isolated from other equipment and circulated in the manner of Example 4 with the solution of Example 1 for 6 hours at 200° F. After flushing with water as in Example 4, this reactor was opened and found to be 100% free of polymer residue including carbonized polymer residue.

EXAMPLE 6

Another poly-condensation reactor was isolated from the other equipment and circulated in the manner of Example 4 with the solution of Example 1 for 6 hours. Due to insufficient steam use, a top temperature of 170° F resulted. After flushing with water as in Example 4, the unit was opened and inspected and proved to be only 40% to 50% clean. The reactor was then reclosed and circulated for 6 hours with the solution of Example 1 at 200° F. The water flush was repeated. On opening and inspecting the reactor, it was found to be 100% clean. This demonstrates that a 170° F temperature is too low to accomplish the cleaning desired.

EXAMPLE 7

A group of spinnerette packs arranged for parallel flow were isolated from other equipment and circulated in the manner of Example 4 with the solution of Example 1 at 200° F for 4 hours. Following flushing with water as in Example 4, the packs were inspected and proved to be 100% free of polymer residue.

EXAMPLE 8

An entire system for the production of terephthalate polyesters except the spinnerette packs, including vapor return section, was cleaned with the solution of Example 1 for 6 hours at 200° F. Process pumps were used to circulate the solution and heat was provided through process heat exchangers having steam on the shell side and the material circulating through the tube side of said heat exchangers. The approximately 1,500 gallons of cleaning solution was augmented with additional cleaning solution such that continuous flow through the system was maintained. After flushing the system with water at about 175° F for 1 hour, the equipment in the system was opened and inspected and found to be cleaned of polymer residue including carbonized polymer residue.

EXAMPLE 9

This example shows both successful cleanings using a regenerated cleaning solution and the successful use of a solution of potassium hydroxide in water absent the chelating agent and surfactant. A spent cleaning solution having the original formulation of 45% by weight potassium hydroxide in water used in cleaning a single esterification reactor was collected. After settling out solids, the clear spent solution was pumped into a holding tank and analyzed for its potassium hydroxide concentration. Additional potassium hydroxide was added to return the solution to the original 45% by weight concentration. The solution was then re-used at 200° F for 6 hours on another esterification reactor containing polymer residues with 100% cleaning results after flushing with water at 175° F for about 1 hour.

Having described our invention, modification and changes may be made by those skilled in the art without departing from the scope and spirit thereof.

We claim:

1. A method for removing deposited polymer residue from equipment used in the manufacture of terephthalate polyester resins which consists essentially of:
   a. contacting said polymer residue with an aqueous solution containing at least about 35% by weight potassium hydroxide, up to about 7.0% by weight of a chelating agent, and up to about 1.5% by weight of a surfactant stable in said potassium hydroxide solution at the temperature used; said aqueous solution contacting said residue at a temperature of at least about 180° F; and
   b. flushing the equipment with water at a temperature of at least about 160° F.

2. The method of claim 1, wherein the aqueous solution and the flush water are continuously circulated through the equipment wherein the polymer residue is deposited.

3. The method of claim 2, wherein the solution is circulated at a temperature of from about 195° F to about 210° F.

4. The method of claim 3, wherein the aqueous treating solution contains from about 2.5% to about 7.0% by weight of a chelating agent.

5. The method of claim 4, wherein the aqueous treating solution contains from about 0.5% to about 1.5% by weight of a surfactant stable in said aqueous solution.

6. The method of claim 5, wherein the aqueous solution consists essentially of from about 40% to about 45% by weight potassium hydroxide and from about 4.5% to about 5.5% by weight of the chelating agent with the balance being water, and, further, the water used in the flushing step is at a temperature of from about 160° F to about 210° F.

7. The method of claim 6, wherein the chelating agent is sodium gluconate.

8. The method of claim 1, wherein the aqueous solution consists essentially of from about 35% by weight to about 55% by weight potassium hydroxide, from about 2.5% by weight to about 7.0% by weight of a chelating agent and from about 0.5% by weight to about 1.5% by weight of a surfactant stable in the aqueous solution at the temperature used for cleaning.

9. The method of claim 8, wherein the chelating agent is sodium gluconate.

* * * * *